United States Patent [19]
Griffiths

[11] Patent Number: 5,466,266
[45] Date of Patent: * Nov. 14, 1995

[54] CLOSED SYSTEM MULTISTAGE SUPERPURIFICATION RECRYSTALLIZATION

[76] Inventor: Kenneth F. Griffiths, 415 Whitewater Ave., Fort Atkinson, Wis. 53538

[ * ] Notice: The portion of the term of this patent subsequent to Jul. 7, 2009, has been disclaimed.

[21] Appl. No.: 79,000

[22] Filed: Jun. 17, 1993

[51] Int. Cl.⁶ .................................................. C03B 7/08
[52] U.S. Cl. ................ 23/295 R; 23/302 R; 422/245.1; 422/254; 585/815
[58] Field of Search ................ 23/295 R, 296, 23/298, 300, 301, 302 R, 364, 305; 422/254, 245.1; 585/815

[56] References Cited

U.S. PATENT DOCUMENTS

| | | | |
|---|---|---|---|
| Re. 32,241 | 9/1986 | Saxer | 62/542 |
| 2,147,222 | 2/1939 | Treub | 87/12 |
| 2,835,598 | 5/1958 | Kolner | 99/205 |
| 2,851,368 | 9/1958 | Findlay | 99/205 |
| 3,128,188 | 4/1964 | McIntire | 99/48 |
| 3,167,401 | 1/1965 | Herman | 23/295 |
| 3,337,307 | 8/1967 | Kuster | 23/312 |
| 3,393,055 | 7/1968 | Stevenson | 23/335 |
| 3,442,801 | 5/1969 | Anderson | 210/59 |
| 3,599,701 | 8/1971 | Mollerstedt | 159/47 |
| 3,725,127 | 4/1973 | Retal et al. | 23/295 |
| 3,902,855 | 9/1975 | Lynch | 23/273 MT |
| 3,992,900 | 11/1976 | Campbell | 62/541 |
| 4,143,524 | 3/1979 | Thijssen | 62/542 |
| 4,338,109 | 7/1982 | Tijssen et al. | 62/541 |
| 4,406,679 | 4/1983 | Wrobel et al. | 62/541 |
| 4,430,104 | 2/1984 | Van Pelt et al. | 62/123 |
| 4,508,553 | 4/1985 | Thijssen et al. | 62/541 |
| 4,544,391 | 10/1985 | Oka | 62/541 |
| 4,557,741 | 12/1985 | Van Pelt | 62/541 |
| 4,588,414 | 5/1986 | Takegami et al. | 23/295 R |
| 4,666,456 | 5/1987 | Thijssen et al. | 23/296 |
| 4,787,985 | 11/1988 | Roodenrijs | 210/772 |
| 4,885,016 | 12/1989 | Griffiths | 62/532 |
| 5,127,921 | 7/1992 | Griffiths | 23/295 R |
| 5,240,467 | 8/1993 | Johnson | 422/254 |

OTHER PUBLICATIONS

Kirk–Othmer Encyclopedia of Chemical Technology, Third Edition, vol. 7, Copper Alloys to Distillation (1979).

*Primary Examiner*—Gary P. Straub
*Attorney, Agent, or Firm*—Lockwood, Alex, Fitzgibbon & Cummings

[57] ABSTRACT

A method and apparatus are provided for superpurifying crystallizable substances to a purity level of 99.999%. Included is a closed multistage system which maintains controlled transfers of material between a plurality of stages. The method and apparatus avoid the need to transfer solid crystals from one stage to another and effect efficient and very effective separation of purified crystals from their mother liquor.

24 Claims, 2 Drawing Sheets

CLOSED SYSTEM MULTISTAGE SUPERPURIFICATION RECRYSTALLIZATION

BACKGROUND AND DESCRIPTION OF THE INVENTION

The present invention generally relates to multistage recrystallization, and more particularly to a multistage method and apparatus particularly well-suited for running under closed conditions to minimize the influence of environmental variations on the method and apparatus. Crystallizable substances are purified to extremely high levels, typically on the order of 99.999 percent purity. Materials are transferred within and between stages of the multistage method and apparatus in a manner whereby no crystallized material need be moved between vessels or stages.

Purification of crystallizable materials by way of recrystallization techniques has been known and practiced for many years. Generally speaking, it is extremely difficult to move trace impurities from crystallizable materials by recrystallization from a saturated solution therefor, or by other techniques including fractional crystallization and fractional freezing procedures. Included are zone refining procedures which typically would increase product purity by adding recrystallization stages, but this would be done at the expense of the percentage yield of product that is formed at the last or purest recrystallization stage. For example, it is well known to use fractional crystallization in separating radium chloride from barium chloride by a classic separation procedure that utilizes a complicated grid pattern of many dozens of separate evaporation dishes or crystallizers. Under this procedure, the crystal crop of each crystallizer is transferred to the adjacent crystallizer in one direction, while the mother liquor is transferred in the opposite, or countercurrent direction. Although increasing concentrations of radium chloride follow movement of the crystal crop from one crystallizer to the next, a very large number of crystallizers are required, and operating costs for this type of system are very high.

Generally speaking, currently available applications for fractional crystallization have recognized the desirability of operating at an optimum reflux ratio while not necessarily effectively providing suitable specifics for implementing this desirable approach. It can be important that reflux ratio conditions be controlled closely, preferably in association with the establishment and maintenance of steady state conditions in each stage of the system, thereby facilitating generally automatic control of reflux ratio conditions by closely monitoring and metering selected material transfers, inputs and/or outputs for each stage of the system. Included as examples in this regard are Griffiths U.S. Pat. Nos. 4,885,061 and 5,127,921, which are incorporated by reference hereinto. Practices of this type typically require the transfer of solid, crystallized material between vessels and between stages of these multistage recrystallization systems.

The multistage recrystallization art also includes multistep recrystallization systems for separating fluid material having two or more different components. For example, U.S. Pat. No. Re. 32,241 describes having a component crystallize on a cooled surface as material containing the component flows down the cooled surface. With this approach, a solution of a given stage is used to wash the crystals formed in that stage before the crystals are transferred to the next purer stage. This wash solution is the solution that is in this stage at the time immediately preceding the crystallization of any material therefrom. In an embodiment of this development, the crystals are transferred to the next purer stage as soon as appropriate valves cause the liquid of the next purer stage to contact and dissolve the crystals. The wash solution, which is used to wash the crystal crop of the given stage, is the purest part of the solution present in that given stage before any material is crystallized from it.

With the approach of U.S. Pat. No. Re. 32,241, the stages preferably operate sequentially. During crystallization, a self-supporting solid layer of crystal cake is formed on the chilled surface of the crystallizer after the mother liquor is drained. This system is not particularly well-suited for refining crystallizable substances which cannot form the self-supporting, adherent layer of solid crystal cake on the chilled surface of the crystallizer. This system is not particularly useful for feed materials which form a flowable slurry or any other form that does not adhere to a chilled surface, such as substances which are recrystallized from a solution comprised of a solute of the material being refined and a solvent for this material. Additionally, crystal cakes formed by systems of this type are not particularly well-suited for effective washing of individual crystals without breaking up the cake and then washing the pulverized crystals with a suitable wash solution. Typically, these cakes are hard and rigid, and only crystals on its exposed surface are effectively washed, the interior crystals not being readily reached by the wash solution.

U.S. Pat. No. 4,787,985 suggests multistage purification through use of a sequential recrystallizer wherein the size and purity of the crystals increases from stage to stage. Crystals are processed by the use of thickener devices or wash columns, and this approach has the disadvantage that crystals are not dissolved and then recrystallized from a purer solution than that from which they were originally formed.

U.S. Pat. No. 4,588,414 suggests the use of a system including a centrifuge arrangement. This countercurrent approach embodies the use of temperature differences between components, with crystals being removed from one crystallizer and being fed to another crystallizer at a higher temperature while the mother liquor moves to another crystallizer of lower temperature.

It has been found that, by proceeding in accordance with the present invention, it is possible to achieve superpurification of crystallizable substances by removal of certain impurities therefrom through a multistage recrystallization procedure that achieves purity levels on the order of 99.999 percent with extremely high yields that are exceptional for multistage recrystallization procedures. Included is an effective manner of controlling reflux ratio conditions while achieving and maintaining steady state operating conditions.

SUMMARY OF THE INVENTION

In summary, the present invention is a method and apparatus for superpurifying crystallizable substances by a multistage recrystallization procedure wherein a plurality of stages including a least pure stage and a purest stage proceed through substantially duplicate cycles conducted substantially simultaneously within the stages. The crystallizable substance is dissolved in each stage and transferred as a fully dissolved component of a so-called new solution to the next purer stage at which the crystallizable material is recrystallized, the procedure continuing until superpurified crystals are formed in the purest of the stages. Crystals formed in each stage are separated from their mother liquor to the extent that mother liquor is withdrawn from between the individual crystals of the crystallized material in a manner which leaves the individual crystals particularly well-oriented and exposable to washing procedures. Preferably, these crystals are washed, and preferably the wash fluid is mother liquor from the next purer stage. All vessels and transfer equipment are closed to environmental influences and do not require transfer of solids, thereby making same particularly well-suited for automatic and especially efficient operation and improved yields.

It is a general object of the present invention to provide an improved method and apparatus for superpurifying crystallizable substances.

Another object of the present invention is to provide an improved superpurification system which is closed to the environment and utilizes multistage recrystallization that is especially well-adapted to automated, commercial scale operation.

Another object of the present invention is to provide an improvement in multistage recrystallization that effectively, efficiently and very closely controls reflux ratio conditions and that can achieve and then maintain steady state conditions.

Another object of this invention is to provide an improved superpurification of crystallizable substances which achieves extremely high purification together with particularly high yields.

Another object of the present invention is to provide an improved apparatus and method for superpurification of crystallizable substances which includes the use of arrangements whereby a wash reflux from one stage of a multistage recrystallization system is used to displace residual mother liquor from crystals formed in a stage that operates at a lower purity level than the stage from which the wash originates.

Another object of the present invention is to provide an improved multistage recrystallization system wherein especially efficient and thorough separation of a minor ingredient from a major ingredient is effected.

Another object of this invention is to provide an improved apparatus and method that utilizes multiple stages and involves forming a new crystal crop in each stage from a new solution containing the dissolved component being purified together with its solvent.

Another object of this invention is to provide an improved multistage fractional crystallization system having a controlled reflux ratio such that the proper reflux ratio can be used to separate out a minor ingredient having a given segregation coefficient.

Another object of the present invention is to provide an improved apparatus and method wherein reflux leaving a given stage of a multistage system is as impure as possible and such that the crystal material leaving that stage is as free of its mother liquor as possible in order to thereby maximize the separation efficiency of each stage.

Another object of the present invention is to provide an improved method and apparatus for readily processing crystallizable materials that form a flowable slurry in a crystallizer, thereby allowing the use of conventional slurry producing crystallizers.

Another object of the present invention is to provide an improved method and apparatus which can be operated in a totally enclosed manner and under super atmospheric pressure, thereby facilitating superpurification refining of substances requiring superheated solvent to dissolve same in commercially important quantities.

Another object of the present invention is to provide a multistage recrystallization process and apparatus which is automated and enclosed and meets sanitation requirements of industries such as the pharmaceutical industry.

These and other objects, features and advantages of the invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
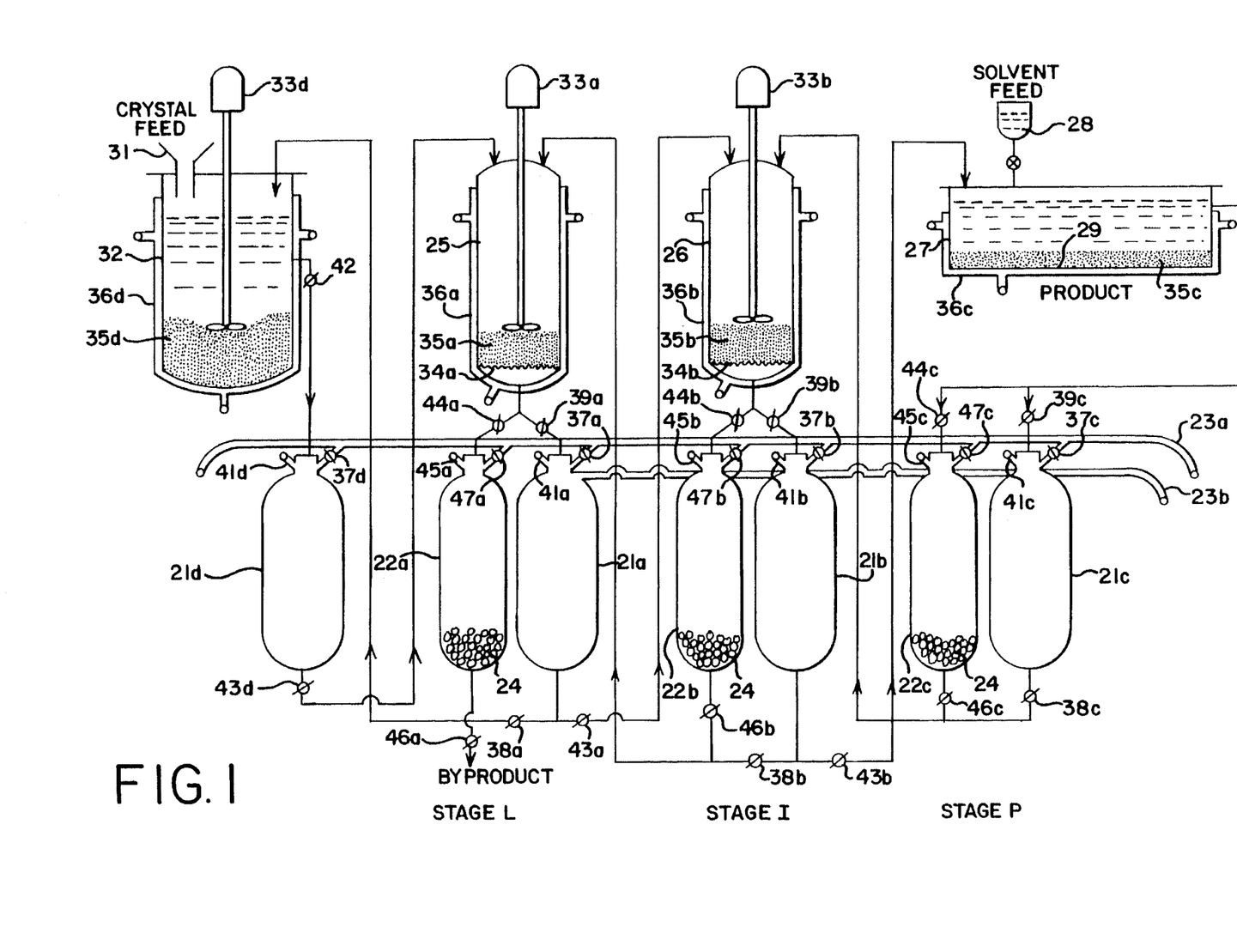
FIG. 1 is a generally schematic view or flow diagram of a closed multistage superpurification system according to this invention.

In the arrangement illustrated in FIG. 1, a closed multistage recrystallization system is shown to include three different stages, each of which, except for portions of the purest stage, possesses substantially equal volumes of components, but with different purity levels being maintained from stage to stage. In the illustrated embodiment, Stage L is the stage at which the crystallizable material therewithin is at a purity level that is the lowest among the stages illustrated. Stage P is the stage at which the purity level is the highest. Stage I is representative of intermediate stages that may be provided and at which the purity level is of an intermediate degree, meaning that same is purer than Stage L and less pure than Stage P. The intermediate stage can be omitted, or additional intermediate stages can be added. In a typical situation, a superpurity level on the order of 99.99 percent purity is attained when multiple intermediate stages are incorporated. If even greater purity, or hyperpurity, is desired, additional intermediate stages could be utilized, although it must be appreciated that the greater the number of intermediate stages, equipment cost, and processing cost and time are increased. Flow rates between these stages are substantially the same, and the flow rates are developed to ensure there is enough solvent to dissolve the crystals at the designated time within each stage.

Each stage includes a liquid receiver 21a, 21b, 21c. Each liquid receiver can include a reflux section. In the illustrated embodiment, the reflux section takes the form of a separate reflux compartment 22a, 22b, 22c. These devices serve to hold and/or meter liquids during various steps of each cycle. Pressure control manifolds 23a, 23b, or similar assembly, is provided so that pressure conditions within selected respective compartments or vessels are substantially the same in each stage at a given processing time within the cycle. Pressure control manifold 23a will, for example, pressurize these compartments or vessels in order to remove liquid therefrom and transfer it to another vessel. Control manifold 23b may subject the vessel or compartment to reduced pressure conditions or vacuum conditions in order to assist in drawing liquid thereto from another vessel or compartment. The manifolds or other suitable means such as the illustrated vents can also achieve venting of these vessels or compartments in order to facilitate entry of liquid thereinto.

These liquid receiver vessels or compartments provide enclosed spaces of known volumes which can be used in metering volumes passed thereinto or supplied thereby by either simply filling the vessel or compartment or by the use of suitable capacity signalling devices. Volume variations can also be adjusted by including a known number of glass or plastic beads 24 or the like, each of which displaces a known volume of liquid. A desired number of such beads can be added to these vessels in order to finely adjust internal volumes.

Each stage also includes a processor 25, 26, 27. The processor of the purest stage, Stage P, can take the form of a crystallizer 27 having a crystal bed volume which is substantially larger than the crystal bed volume 29 provided by the other processors 25, 26. In this manner, the superpurified product can be collected and stored within the crystallizer 27 as superpurified product. Pure solvent feed preferably enters the system through a suitable feed device 28. Crystals to be purified are fed through an inlet 31 into a feed dissolver 32 which preferably has a liquid receiver 21*d* associated therewith. Each processor 25, 26 and the feed dissolver 32 typically include a mixing device 33*a*, 33*b*, 33*d* for facilitating crystal dissolving during a particular phase of the processing cycle. Each processor 25, 26 includes a screen or foraminous plate or filter 34*a*, 34*b* near the bottom portion thereof. Each such screen or filter 34*a*, 34*b* is sized to prevent passage therethrough of crystallizable material when it is in its crystallized state, such as crystals 35*a*, 35*b* illustrated in FIG. 1. Each screen or filter, however, permits passage therethrough of any liquid material which must be withdrawn from the processor at any given time during a cycle.

The term "new solution" is intended to refer to a solution of solute within solvent which is formed within processor 25, 26 or the like. In such a new solution, the crystallizable material is present, but in its dissolved state within the solvent for the particular crystallizable material being processed within the system, the new solution being at an elevated temperature that maintains the crystallizable material in its dissolved state. A supply of new solution, which can be specifically referred to as a feed solution, is formed within the feed dissolver 32 at substantially the same time that the new solution is formed in each of the processors 25, 26. This solution formation is, for many crystallizable materials, assisted by a heating assembly, such as the illustrated heat exchanger 36*a*, 36*b*, 36*d* through which a fluid at an elevated temperature passes. During a run, a substantial supply of hot new feed solution is maintained in the feed dissolver. This supply is sufficient to insure that there would always be enough to provide the proper quantity of new feed solution to the Stage L processor at the proper time during each cycle of a run.

At the beginning of a typical cycle for the system illustrated in FIG. 1, crystals 35*a*, 35*b*, 35*c* and 35*d* are present in their respective vessels such as in the quantities generally illustrated in FIG. 1. Recently washed crystals 35*a*, 35*b* are supported by screens 34*a*, 34*b*, respectively. Superpurified product crystals 35*c*, to the extent they had been produced in a previous cycle, are present in processor crystallizer 27. Crystal feed 35*d* can be present in the feed dissolver. Preferably, each liquid receiver 21*a*, 21*b*, 21*c* is substantially full of mother liquor. In the preferred operation of this embodiment, the mother liquor is a so-called mixed mother liquor, which is a mixture of mother liquor remaining after crystallization in that same stage, combined with mother liquor used to wash the same crystals in a subsequent step of the same processing sequence.

In the first step of this processing sequence, valves 37*a*, 37*b*, 37*c* or similar devices are opened, and pressurized air or other gas such as nitrogen enters respective liquid receivers 21*a*, 21*b*, 21*c* while valves 38*a*, 38*b*, 38*c* or the like are opened, with the result that the mother liquor within the liquid receivers 21*a*, 21*b*, 21*c*, respectively, is transported into the processor 25, 26 of the next less pure stage, or in the case of liquid receiver 21*a* into the feed dissolver 32. After completion of this step, crystals 35*a*, 35*b* and 35*d* are covered with or flooded by the thus transferred mixed mother liquor.

Crystal dissolving is carried out in the second step. This dissolving takes place in the processors 25, 6. Typically, the dissolving procedure is assisted by activation of the mixing devices 33*a*, 33*b* and by applying heat to the mother liquor and crystals such as through activation of the heat exchanger 36*a*, 36*b*. By this action, the slurry of crystals that had been in each of the processors within the mother liquor transferred thereinto is dissolved and thereby transformed into the new solution for each of the respective stages, which is a normal or predetermined volume of new solution charge for which the system is calibrated. This charge of new solution is now ready for transfer as a liquid.

In the third step of this illustrated process, all of the hot new solution within each of the processors 25, 26 is transferred into the liquid receiver 21*a*, 21*b*, of that same stage. This transfer procedure includes opening of valves 39*a*, 39*b* located between the exit from the respective processor and the inlet to the respective liquid receiver. This transfer could be assisted by appropriate venting of the liquid receivers, such as at vents 41*a*, 41*b*, and/or pressurization of each processor by suitable means (not shown). By the time this step is completed, a supply of hot dissolved feed solution is transferred from the feed dissolver 32 into the liquid receiver 21*d* by suitable transfer arrangements, including the opening of valve 42. Preferably, equal volumes of the thus transferred hot new solution and hot feed solution are present within the respective liquid receivers 21*a*, 21*b*, 21*d* at this time.

In the fourth step of this illustrated procedure, all of the hot new solution in each of the liquid receivers 21*d*, 21*a* and 21*b* is transferred into the processor 25, 26 and 27 of the next purer stage. This transfer procedure includes the opening of valves 43*d*, 43*a* and 43*b* located between the exit of the respective liquid receiver and the inlet to the respective processor. This transfer could be assisted by appropriate venting of the processors (not shown) and/or pressurization of each liquid receiver by pressurizing manifold 23*a* and opening valves 37*d*, 37*a* and 37*b*. By the time this step is completed, the new feed solution in liquid receiver 21*d* would have been transferred to processor 25, the new solution in liquid receiver 21*a* would have been transferred to processor 26 and the new solution in liquid receiver 21*b* would have been transferred to processor crystallizer 27.

Each thus transferred solution is subjected to crystallization conditions within a fifth step of this procedure. Crystallization is typically facilitated by reducing the temperature within the processors 25, 26 and the crystallizer 27, such as through the action of heat exchanger 36*a*, 36*b*, 36*c*, typically while stirring the solution during formation of the crystals. After completion of this step, crystals are formed within their mother liquor, both of which are present within the processor 25, 26 and crystallizer processor 27.

In the next, or sixth step this mother liquor is transferred out of the processor 25, 26 and crystallizer processor 27 and into the liquid receiver vessel or vessels of that same stage. In a preferred arrangement in this regard, a controlled quantity of this mother liquor first is transferred into the reflux compartment 22a, 22b, 22c by opening valves 44a, 44b, 44c, typically while vents 45a, 45b, 45c are open so as to facilitate movement of the mother liquor through the valved conduit. In a preferred arrangement, this transfer requires only the further assistance of gravity, although a pumping or pressurizing arrangement can also be used as desired. Typically, the reflux compartment 22a, 22b, 22c will not be large enough to hold all of the mother liquor; accordingly, mother liquor transfer continues by opening valves 39a, 39b, 39c, preferably while vents 41a, 41b, 41c are also open and valves 44a, 44b, 44c are closed.

In a related, seventh step, the crystals are subjected to a dewatering procedure. As illustrated, manifold 23b is activated so as to reduce the pressure, or create a vacuum condition, within at least liquid receiver 21a, 21b. This provides the function of a suction filter or plate filter and achieves the beneficial result of withdrawing the mother liquor which remains between the crystals after the initial transfer of mother liquor out of the processors 25, 26. During the course of the mother liquor transfer of these sixth and seventh steps, the newly formed crystals remain supported by the screen or filter 34a, 34b. Advantageously, the crystals 35a, 35b cover an area which is typically equal to or approximately the same as the surface area of the screens 34a, 34b. This area is preferably significantly larger than the depth of crystals supported thereby in order that the dewatering procedure may be more effectively accomplished than if the mother liquor being subjected to the dewatering conditions had to travel through a greater depth of crystals. It is particularly important that the crystals 35a, 35b be supported by the screen 34a, 34b or the like, rather than, for example, caked along the sidewalls of a crystallizer after crystallization has been completed.

The eighth and final step of this illustrated procedure is optional, although it is preferred. Same is a step of washing the just dewatered crystals with mother liquor separated from crystals formed in the next purer stage. In the illustrated embodiment, this is most readily accomplished by opening valves 46b, 46c and pressurizing the reflux compartments 22b, 22c by activating the manifold 23a while valves 47b, 47c are open. As a result, the purer stage mother liquor passes over and through the crystals within the processor 25, 26 in order to carry out a reflux wash procedure to remove most of the mother liquor from this stage that still wets the dewatered crystals. The crystals are thus washed with liquid from the next purer stage before those crystals are dissolved in the mixed mother liquor of the next purer stage. The effectiveness of this washing is facilitated by the configuration of the cake containing crystals 35a, 35b which are supported by the screen 34a, 34b, rather than being caked along the sides of a crystallizer as generally discussed herein.

Byproduct in the form of mother liquor from the least pure stage exits the system upon opening valve 46a, which removal may be assisted by pressurization of the reflux compartment 22a, such as by activation of the manifold 23a and opening of the valve 47a. By the arrangement shown in FIG. 1, it is possible to have the same volume of mother liquor exit the system during each cycle as is transferred as reflux from each stage to the next less pure stage. Also, enough pure solvent enters the Stage P crystallizer to maintain the proper quantity of mother liquor therein and to make up the reflux that must be fed to the Stage I processor 26. A crystal product 35c may be removed at any time in any suitable manner, but typically after several cycles have been run whereby a sizable quantity of superpurified crystals are available. Accumulated crystals should be removed often enough to prevent the crystallizer from becoming overloaded with crystals.

If desired, only one processor 26 can be used, in which event processor 25 and any other less pure stage processors are simply vessels for receiving and/or forming new solution. Each of such new solutions of varying purity is then transferred, one after the other, to the single processor 26 which crystallizes and otherwise processes the crystals as discussed herein. For example, vessel 25 in this arrangement still receives mother liquor from the liquid receiver 21b and/or the reflux compartment 22b and transfers the new solution formed therein to the processor 26 through conduit containing valve 43a.

Figure 2:
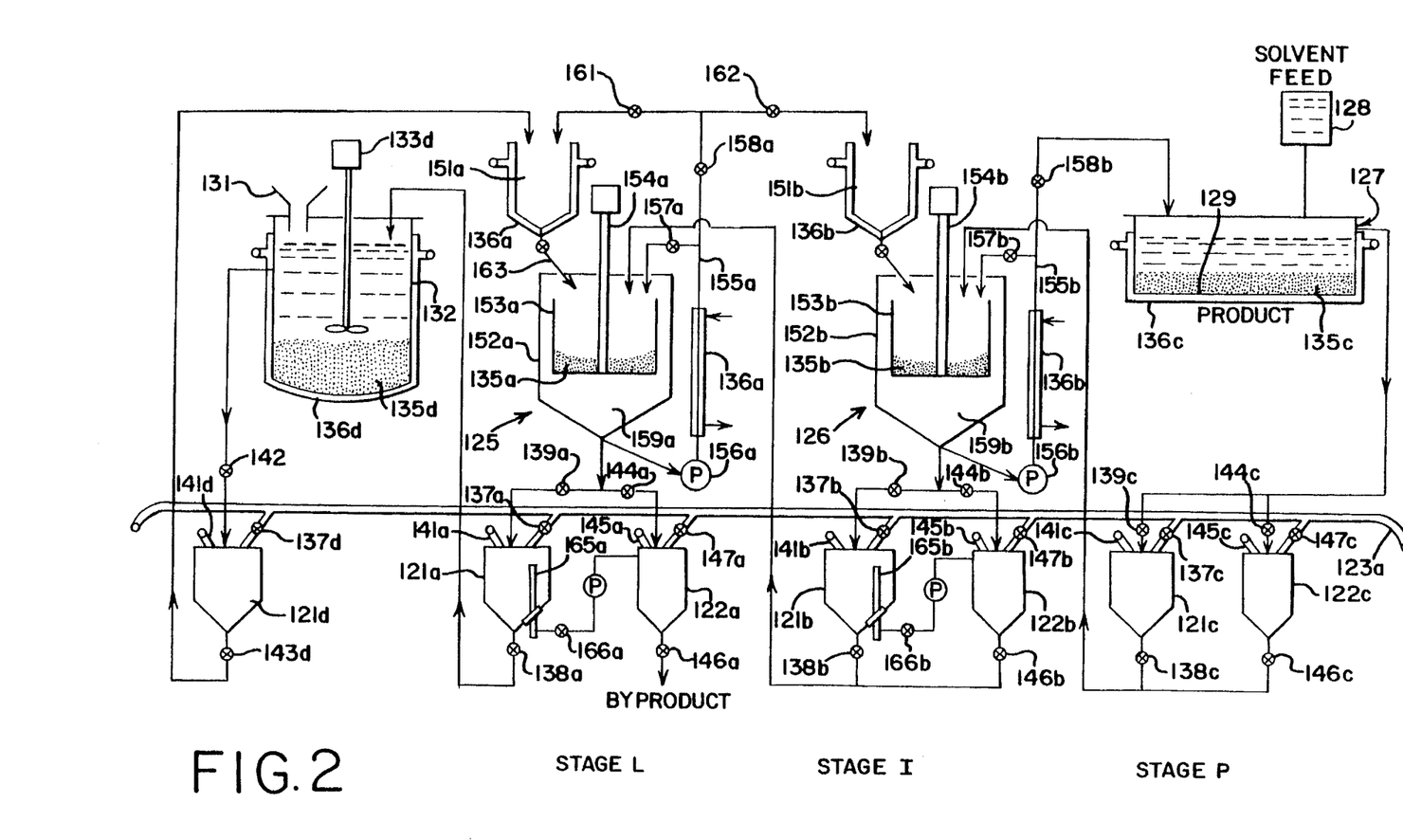
FIG. 2 is a generally schematic view or flow diagram of an alternate embodiment for carrying out the closed multistage recrystallization superpurification according to the present invention.

FIG. 2 shows an alternate, preferred embodiment of the closed multistage recrystallization system of this invention, three different stages again being shown. The primary functional difference between the embodiment of FIG. 1 and the embodiment of FIG. 2 lies in the processor assemblies. FIG. 2 includes the combination of a crystallizer, a centrifuge assembly, a mother liquor circulation pump and a mother liquor heater, as the processor of Stages L and I. With this arrangement, the processors as illustrated in the FIG. 1 embodiment, including their screens and the suction filter or plate filter arrangement need not be included. Mother liquor removal from and dewatering of the freshly prepared crystals are accomplished by the centrifuge assemblies.

In the illustrated FIG. 2 embodiment, Stage L is the stage at which the crystallizable material therewithin is at a purity level that is the lowest among the stages illustrated. Stage P is the stage at which the purity level is the highest. Stage I is representative of intermediate stages that may be provided and at which the purity level is of an intermediate degree, meaning that same is purer than Stage L and less pure than Stage P. The intermediate stage can be omitted, or additional intermediate stages can be added. In a typical situation, a superpurity level of on of the order of 99.999 percent purity is attained when multiple intermediate stages are incorporated. If even greater purity, or hyperpurity, is desired, additional intermediate stages could be utilized, although it must be appreciated that the greater the number of intermediate stages, equipment cost, and processing cost and time are increased. Flow rates between these stages are substantially the same, and the flow rates are developed to ensure there is enough solvent to dissolve the crystals at the designated time within each stage.

Each stage includes a liquid receiver 121a, 121b, 121c. Each liquid receiver can include a reflux section. In the illustrated embodiment, the reflux section takes the form of a separate reflux compartment 122a, 122b, 122c. These devices serve to hold and/or meter liquids during various steps of each cycle. A pressure control manifold 123a, or similar assembly, is provided so that pressure conditions within selected respective compartments or vessels of each stage are substantially the same during a given processing time within the cycle. Pressure control manifold 123a will, for example, pressurize these compartments or vessels in order to remove liquid therefrom and transfer it to another vessel. Preferably, these vessels or compartments include vents in order to facilitate entry of liquid thereinto. These liquid receiver vessels or compartments provide enclosed spaces of known volumes which can be used in metering volumes passed thereinto or supplied thereby by either simply filling the vessel or compartment or by the use of suitable capacity signalling devices.

Each stage also includes a processor, generally designated as 125, 126, 127. The processor of the purest stage, Stage P, can take the form of a crystallizer 127 having a crystal bed volume 129 which is substantially larger than the crystal bed volume provided by the other processors 125, 126. In this manner, the superpurified product formed during each cycle can be collected and stored within the crystallizer 127 as superpurified product. Pure solvent feed preferably enters the system through a suitable feed device 128. Crystals to be purified are fed through an inlet 131 into a feed dissolver 132 which preferably has a liquid receiver 121d associated therewith. The feed dissolver 132 typically includes a mixing device 133d for facilitating crystal dissolving therewithin.

Each processor 125, 126 is an assembly of a crystallizer 151a, 151b, a centrifuge 152a, 152b, a liquid circulation pump 156a, 156b and a liquid heater 136a and 136b. Each centrifuge includes a centrifuge basket 153a, 153b or similar holding device which is mounted in a suitable fashion to a rotatable shaft 154a, 154b having suitable power means for rotating the shaft and the basket or the like. Each basket 153a, 153b or the like has a wall area composed of screen material which acts as a foraminous plate or filter. The screen or filter material of each such basket 153a, 153b or the like is sized to prevent passage therethrough of crystallizable material when it is in its crystallized state, such as crystals 135a, 135b illustrated in FIG. 2. The screen or filter material of each basket, however, permits passage therethrough of any liquid associated with the crystals. This includes mother liquor and new solution as previously defined.

Enough hot feed solution should be present in the feed dissolver to insure an adequate supply of it to the Stage L crystallizer 151a, during every cycle of a run. Also, during each cycle, the feed dissolver receives a charge of cold mixed mother liquor from Stage L, heats that charge to a predetermined temperature and provides conditions to enable that heated solution to dissolve the proper quantity of feed crystals. The heating of this solution can be assisted by a heating assembly, such as the illustrated heat exchanger 136d typically having a jacketed passageway through which a fluid at a controlled elevated temperature passes. Also, heat exchangers 136a and 136b are used to heat mother liquor in these stages for the purpose of crystal dissolving therein.

At the beginning of a typical cycle for the system illustrated in FIG. 2, crystals 135a, 135b and 135d are present in their respective vessels such as in the quantities generally illustrated in FIG. 2. Superpurified crystals 135c can also be present in the processor crystallizer 127 if the system had already been cycled to form superpurified crystals during start-up operations. Recently washed crystals 135a, 135b are supported within baskets 153a, 153b, respectively. Crystal feed 135d can be present in the feed dissolver 132. Preferably, liquid receivers 121a, 121b, 121c are each substantially full of mixed mother liquor. In the preferred operation of this embodiment, the mixed mother liquor is a mixture of mother liquor of crystallization from that same stage, together with mother liquor reflux from the next purer stage which was used to wash the same crystals in a step during the previous cycle.

In the first step of this processing sequence, valves 137a, 137b, 137c or other devices performing a valving function are opened, and pressurized air or other gas such as nitrogen enters respective liquid receivers 121a, 121b, 121c while valves 138a, 138b, 138c or the like are open, with the result that the mother liquor within the liquid receivers 121a, 121b, 121c, respectively, is transported into the centrifuge basket 153a, 153b of the next less pure stage, or in the case of liquid receiver 121a into the feed dissolver 132.

After completion of this step, crystals 135a, 135b and 135d preferably are covered with or flooded by the thus transferred mixed mother liquor by having the liquid level in each centrifuge catch basin reach high enough to flood the centrifuge basket to a level high enough to cover any charge of dewatered crystals therein and to permit a complete mixing of the flooded crystals with the heated mother liquor. The discharge end of the conduit from the hot end of the mother liquor heat exchanger is positioned to agitate the mixture of crystals and heated mother liquor in the basket. Alternatively, the crystals can be dissolved in the centrifuge basket by having the centrifuge catch basin be empty and by spraying the heated mother liquor over the exposed surface of the mass of crystals in the basket. In this case, the basket may or may not be spinning at the time of crystal dissolving.

Crystal dissolving is carried out in the second step. This dissolving takes place in the centrifuges 152a, 152b. Typically, the dissolving procedure is assisted by activation of a circulation circuit 155a, 155b having heat exchangers 136a, 136b and pumps 156a, 156b in order to circulate and mix the mother liquor and crystals while heating them to facilitate crystal dissolving. By this action, the crystals that had been in each of the centrifuges within the mother liquor transferred thereinto is transformed into the required volume or charge of heated new solution for each of the respective stages. This charge is ready to be transferred as a liquid.

In the third step of the sequence discussed herein, all of the solution within each of the centrifuges 152a, 152b is transferred into the processor crystallizer 151b, 127 of the next purer stage. In the preferred illustrated embodiment, the transfer is effected by continuing or resuming operation of the pump 156a, 156b, while closing valve 157a, 157b and opening valve 158a, 158b.

The fourth step, which may be carried out for, after, or simultaneously with the third step, achieves transfer of hot feed solution from the feed dissolver 132 into the processor crystallizer 151a of the next purer stage. In the case of the illustrated embodiment, this is Stage L. This transfer is typically effected by first filling liquid receiver 121d with a volume of hot feed solution that is the same as the normal or predetermined controlled volume of new solution charge. This feed solution charge is then transferred from liquid receiver 121d into the processor crystallizer 151a. In the illustrated embodiment, this is accomplished by opening valve 137d and applying a positive pressure by way of a manifold 123a while the vent 141d is closed, valve 142 is closed, and the valve 143d is opened. At this time, equal volumes of thus transferred hot feed solution and hot new solution are present within the respective processor crystallizers 151a, 151b. Additionally, a charge of this same volume of the purest hot new solution is transferred to processor crystallizer 127.

Each thus transferred solution is subjected to crystallization conditions within a fifth step of this procedure. Crystallization is typically facilitated by reducing the temperature within the processor crystallizer 151a, 151b, 127, such as through the cooling action of heat exchanger 136a, 136b, 136c, typically while stirring the solution during formation of the crystals. After completion of this step, crystals are formed within their mother liquor to form a slurry of crystals in a mother liquor within the processor crystallizer 151a, 151b.

In the next, or sixth step this crystal and mother liquor slurry is transferred out of the processor crystallizer 151a, 151b and into the centrifuge basket 153a, 153b of that same stage and processor assembly. Crystals remain in the basket, and mother liquor is allowed to pass into the liquid receiver vessel or vessels of that same stage. In a preferred arrangement in this regard, this mother liquor transfer is first made from centrifuge catch basin 159a, 159b into the reflux compartment 122a, 122b by opening valves 144a, 144b, typically while vents 145a, 145b are open so as to facilitate movement of the mother liquor through the valve conduit therebetween. A controlled volume of mother liquor is thus transferred in each stage.

Similarly, the purest mother liquor, which can include solvent feed 128, is transferred to the liquid receiver vessel or vessels of that same stage, which is Stage P. This transfer can first be made by passing the same controlled volume into the reflux compartment 122c by opening valve 144c, typically while vent 145c is open.

These transfers can be initiated by gravity, although pumping or pressurizing can also be practiced. In the preferred embodiment which is illustrated, the separation of crystals from their mother liquor within the Stage L and Stage I processors is facilitated by activation of the centrifuge 152a, 152b.

Typically, the reflux compartment 122a, 122b, 122c will not be large enough to hold all of the mother liquor; accordingly, mother liquor transfer continues by opening valves 139a, 139b, 139c, preferably while vents 141a, 141b, 141c are also open. Valves 144a, 144b, 144c may be closed by this time. In a related, seventh step, the crystals within the centrifuge basket 153a, 153b are subjected to a dewatering procedure. Centrifugation continues in order to provide the function of a suction filter or plate filter and achieves the beneficial result of withdrawing the mother liquor which remains between the crystals after the initial transfer of mother liquor out of the centrifuges. During the course of the mother liquor transfer of these sixth and seventh steps, the newly formed crystals remain supported by the centrifuge basket 153a, 153b.

The last step of this illustrated procedure is optional, although it is preferred. It is a step of washing the just dewatered crystals with mother liquor separated from crystals formed in the next purer stage. In the illustrated embodiment, this is most readily accomplished by opening valves 146b, 146c and pressurizing the reflux compartments 122b, 122c by activating the manifold 123a while valves 147b, 147c are open. As a result, the purer stage mother liquor passes over and through the crystals within the centrifuges 125, 126, particularly their centrifuge baskets 153a, 153b in order to carry out a reflux wash procedure to remove less pure mother liquor that remains even after dewatering. The washing is facilitated because there is no need to break up or pulverize a cake to effectively wash the crystals.

Byproduct in the form of mother liquor from the least pure stage exits the system upon opening valve 146a, which removal may be assisted by pressurization of the reflux compartment 122a, such as by activation of the manifold 123a and opening of the valve 147a while vent 145a is closed. By the arrangement shown in FIG. 2, it is possible to have the same volume of mother liquor exit the system during each cycle as is transferred as reflux from each stage to the next less pure stage. Also, enough pure solvent enters the Stage P crystallizer to maintain enough mother liquor therein to supply vessels 122c and 121c with an adequate quantity of mother liquor. Crystal product 35c may be removed at any time in any suitable manner, but typically after several cycles have been run whereby a sizable quantity of superpurified crystals are available for final collection.

If desired, only one centrifuge processor 126 can be used, in which event centrifuge processor 125 and any other less pure stage processors are vessels for receiving and/or forming new solution. Each of such new solutions of varying purity is then transferred, one after the other, to the single centrifuge processor 126 which crystallizes and otherwise processes the crystals as discussed herein. For example, vessel 125 in this arrangement is a vessel having heating capabilities to form new solution as needed, and it receives mother liquor from the next purer stage which is incorporated into new solution then transferred to the centrifuge processor 126 through valve 162.

In some cases, a combination of a crystallizer and a centrifuge, which is similar to that used for Stage I, may be employed for Stage P. In this case, the centrifuge may be of the type that effects the discharge of its load of dewatered crystals from its centrifuge basket at the appropriate time during each cycle. When this approach is used, it is preferred to add solvent for reflux makeup during each cycle for crystal washing. Also, in this case, the amount of Stage P mother liquor holdup can be smaller than if a large crystallizer would be used for that stage.

Centrifuge utilization such as illustrated in FIG. 2 is believed to provide a greater degree of liquid-solid separation than the suction filter arrangement of FIG. 1. The FIG. 2 centrifuge arrangement is typically preferred in situations in which the mother liquor is viscous and difficult to drain from the crystal, the solute is exceptionally soluble in the solvent, or the crystals are unusually fine or difficult to drain.

It will be appreciated that the use of liquid receivers and/or reflux compartments of known volumes can play an important part in the metering function which is important to maintaining a controlled reflux ratio and steady state conditions. Volume and/or weight preselections can be made by filling these vessels, such as the reflux compartment, to a desired level which can be signified, for example, by a liquid level responsive probe within or associated with the vessels in order to detect when a certain volume of mother liquor has been attained. Other approaches include the use of overflow conduits or the like. An adjustability function is achieved, for example, by providing multiple liquid level probes, a selected one of which is activated in order to vary controlled quantities and/or mark adjustments for processing different crystallizable materials.

With more particular reference to the various controlling and/or metering functions and means, the following controlling and/or metering aspects are preferred. During each cycle, substantially the same volume or controlled quantity of mixed mother liquor should be transferred from each stage to the next less pure stage. During each cycle, substantially the same volume or controlled quantity of feed solution or new solution should be transferred from each stage to the next purer stage. During each cycle, a controlled quantity or volume of mother liquor should be discharged from the least pure stage as byproduct from the refining system, which controlled volume should be substantially the same as that of the reflux added to Stage L by means of reflux compartment 122c. During each cycle, the weight of crystal feed material which is included in the new feed solution transferred to the processor should be substantially the same as the crystals formed within the crystallizer of Stage P. The reflux ratio is the ratio of the weight per cycle of reflux solute (which is discharged from each stage of the system, monitored for example at the purest stage) to the weight per cycle of crystal product formed in this same stage. Generally speaking, the higher the reflux ratio, the greater is the difference in purity per stage from one stage to the next purer stage, and the lower the reflux ratio, the greater the amount of crystal product produced in each cycle. Controlling the reflux ratio may include controlling the weight of reflux solute that is transferred per unit of time from each stage to the next less pure stage, and by controlling the weight of crystal product within the solution which is transferred per unit time from each stage to the next purer stage.

As generally stated herein, it is desirable and necessary to maintain the same amount of solvent in each stage during each cycle of a run. The same volume of mother liquor is to be maintained in each stage at the end of each cycle. With reference to FIG. 2 and the Stage P reflux receiver 122c and liquid receiver 121c, the volume of reflux being transferred from Stage P to Stage L during each cycle is controlled by the volume of the Stage P reflux receiver. In each of Stages I and L, the liquid receiver 121a, 121b is preferably provided with an overflow conduit 165a, 165b that has a valve 166a, 166b and empties into the reflux receiver 122a, 122b of the same stage. Preferably, the overflow level of this conduit 165a, 165b is variable (such as having its inlet be adjustable in height) to permit any desired volume of mother liquor to remain in the liquid receiver after the overflow had been discharged through the overflow conduit to the reflux receiver.

This arrangement provides a variable metering assembly operated in the following manner, for example. During the centrifuging of the slurry, the mother liquor is collected in that stage's liquid receiver as usual. However, this receiver 121a, 121b holds only a predetermined volume of this liquor and permits the overage to overflow into that stage's reflux receiver. During the period when mother liquor is flowing into the liquid receiver, the valve in the overflow conduit is open. At the end of this period when the flow of mother liquor to the reflux receiver is complete, this valve is closed. During the reflux transfer and crystal washing period, the valve 166a, 166b is closed, and the reflux effluent of the crystal washing is collected in the liquid receiver. Therefore, none of the reflux effluent enters the reflux receiver and all of it is retained in the liquid receiver.

When this variable metering procedure is used, the volume of reflux transferred from each stage to the next less pure stage during each cycle is equal to the volume of reflux transferred from the Stage P reflux receiver 121c to Stage I. Also, the volume of mother liquor effluent derived from the centrifuging of the crystals in a stage (such as Stage I or Stage L) is equal to the holdup volume of that stage's liquid receiver plus the reflux volume received by that stage during a cycle. The holdup volume is the volume of mother liquor retained in a stage's liquid receiver after the excess mother liquor is discharged through the overflow conduit. When this system is operating under normal equilibrium conditions, the weight of solvent in each Stage I and Stage L is equal to that contained in the liquid receiver and the reflux receiver of that stage at the completion of the overflow of mother liquor to the reflux receiver.

For example, Stage P reflux receiver 122c could have a one gallon volume, and the holdup volume of the Stage L and the Stage I liquid receiver could each be 4 gallons, and each would retain 4 gallons after the excess of mother liquor has flowed out through the overflow conduit. Therefore, during each cycle, one gallon of Stage P reflux is transferred to Stage I. In this example, as soon as the system reaches equilibrium operation, one gallon of mother liquor overflows from the Stage I and Stage L liquid receiver into that same stage's reflux receiver during each cycle. The net result of this method of operating the refiner in this example is that there would always be 5 gallons of mother liquor in each stage (Stage I and Stage L) during the liquid-solid separation period of each cycle. By suitable variation of the metering overflow conduit 165a, 165b, the volume of reflux for a run could easily be changed to, for example, 2 gallons. The volume of the Stage P reflux receiver is changed from one to two gallons, and the level of the overflow conduit 165a, 165b is lowered to reduce the holdup volume of each of these receivers to 3 gallons. Mother liquor holdup in Stage I and Stage L remains at 5 gallons during the liquid-solid separation period of each cycle.

An indirect metering approach can be used by providing sample ports or the like in particular vessels as needed. The percentage of solute in the reflux is a function of its specific gravity, and monitoring same may be useful in providing the proper volume of reflux needed in order to result in having the correct weight of solute transferred as reflux. It may also be desirable and preferred to monitor and control the specific gravity of the new solution made during each stage.

When a steady state condition is achieved with the present invention, the system exhibits the following characteristics. The same weight of crystallizable material to be purified is present in the new solution of each stage while crystallizing is occurring. Each stage thus produces the same weight of crystal product during each cycle. The same weight of byproduct solute is produced during each cycle. The weight of product per cycle is substantially the same as the weight of feed dissolved in the feed dissolver per cycle minus the weight of byproduct solute produced per cycle. Each cycle has substantially the same reflux ratio. Steady state condition maintenance typically includes monitoring and (when necessary) adjusting the final temperature of the crystallization step of each stage. Under normal operating conditions of the refiner, this temperature is the same as the liquid-solid separation temperature in the processors. In addition, this temperature is also the same as the crystallization temperature of the mother liquor effluent from the liquid-solid separation step. The weight of solute per liter of solution is a function of the crystallization temperature of the solution and usually increases with a rise in this temperature. Therefore, the operator of the refiner can best regulate the weight of solute in each volume or liter of mother liquor by adjusting the final temperature of the crystallization step for each stage. It is preferred that this temperature be the same for all stages and for all cycles in order that the mother liquor of all stages contain the same weight of solute per liter. All of the new solution for recrystallization which is formed in each stage is transferred to the next purer stage during each cycle. Product, byproduct and feed are likewise controlled It will be appreciated that the multistage recrystallization system of this invention is one which is carried out in a totally enclosed refiner which can operate under superatmospheric pressures. Such a totally enclosed system can meet the sanitary standards required by, for example, the pharmaceutical industry. Superatmospheric pressure operation permits the refining of substances that must utilize superheated solvent to dissolve a reasonable quantity of crystal material in the crystal dissolver of a given stage. This permits the processing of materials such as terephthalic acid, which dissolves in water at 235° C.

When proceeding with the preferred method incorporating centrifuge techniques, it is desirable that the slurry which flows to the centrifuge basket be maintained in a very fluid state to thereby prevent any possibility of clogging of the conduit leading from the crystallizer to the centrifuge basket.

Important in this regard is preventing the percentage of solid or crystal material in the slurry from exceeding 10 to 20 percent by weight depending upon the substance being refined. Found to be of assistance in this regard is continuously pumping the body of new solution in a circuit including the centrifuge catch basin, the crystallizer and the centrifuge basket. This cycle is generally illustrated in Stage L of FIG. 2. The circuit includes the crystallizer 151a, the basket 153a, the catch basin 159, operation of the pump 156a and opening of the valves 158a and 161 while valve 162 is closed. The new solution effluent leaving the centrifuge catch basin is substantially free of crystals, with the crystals in the slurry having been deposited into the centrifuge basket. The temperature drop of the mother liquor passing through the heat exchanger 136a should be limited such that the percentage content by weight of solid crystal material in the slurry leaving the temperature dropping heat exchanger 136a would be low enough so the slurry is sufficiently fluid to prevent any possible clogging of the conduit 163 between the crystallizer and the centrifuge basket.

Possible clogging can also be minimized by conducting at least two distinct, progressively cooler crystallization steps. The first such step would be at a temperature to produce a very liquid slurry of crystals which would easily pass through conduit 163. After the mother liquor thereof is passed through the cycle just discussed in order to re-enter the crystallizer 151a, the temperature provided by the heat exchanger 136a is lowered so that additional crystals will form for passage through the conduit 163. Thus, each slurry passing through the conduit 163 contains fewer crystals than if all of the crystallizable material within the new solution were crystallized and passed into the centrifuge in a single step.

During refining, material balance and material flow are controlled as follows. The same volume of warm new feed solution from the feed dissolver is metered to the Stage L process vessel during each cycle. The same volume of cold mixed mother liquor produced in the Stage P crystallizer is metered to the process vessel of Stage I. All of the mixed mother liquor which is collected in the liquid receiver of each stage is transferred to the next less pure stage during each cycle. All of the warm new solution produced in the process vessel during each stage is transferred to the process vessel or crystallizer of the next purer stage during that cycle. All of the crystals which are produced in each stage's process vessel during each cycle are separated from their mother liquor and then dissolved in mixed mother liquor from the next purer stage during each cycle.

During any cycle, the same volume of reflux liquid is transferred to the next less pure stage or discharged as byproduct, and this same volume of pure reflux is generated in Stage P. During any cycle, the same weight of reflux solute is transferred from each stage to the next less pure stage; or, in the case of Stage L, to a byproduct discharge conduit. It has been found that the best method to do this is to transfer the same volume of reflux per cycle from each stage and to utilize the same liquid-solid separation temperature for all liquid-solid separation procedures conducted during a run. Enough feed crystal material and warm new feed solution are maintained in the feed dissolver to provide enough crystal material and solution to the Stage L process vessel during each run. The Stage P crystallizer has enough mother liquor holdup to provide the required supply thereof for the next less pure stage during each cycle.

Each body of warm new solution that is fed to the process vessel or crystallizer and each body of cold mixed mother liquor that is transferred to the process vessel or feed dissolver contains substantially the same weight of solvent during each cycle of a run. Each body of solution that services two adjacent process vessels is maintained with a constant contained weight of solvent which is the same as the weight in each charge of warm new feed solution.

As for temperature conditions, during the crystallization period of each cycle, the same minimum temperature is to be achieved in the slurry contained in each process vessel or crystallizer, which minimum temperature is to be above the temperature at which solvent crystals would start to form from the mother liquor. Also, during the crystal dissolving period of each cycle, the mixture of crystals and mixed mother liquor in each process vessel should be heated sufficiently to dissolve all of the crystals in the mixture, usually at a temperature only several degrees Centigrade above the temperature in the feed dissolver. Furthermore, the mixture of feed crystals and mother liquor in the feed dissolver should be maintained at a constant temperature such that each charge of warm new feed solution has the same crystallization temperature.

The procedure and apparatus according the present invention are suitable for superpurification of various crystallizable inorganic and organic materials within solvents therefor, such as water, alcohols, ethers, ketones, and the like. Exemplary recrystallizable materials in this regard include sodium chloride, potassium chloride, Cesium chloride, barium nitrate, copper nitrate, sodium iodide, barium chloride, copper sulfate, nickel sulfate, ammonium aluminum sulfate, ammonium molybdate, guanidine hydrochloride, urea, naphthalene, citric acid, acrylamide, benzoic acid, and the like. The following Examples illustrate some specific procedures suitable for these types of materials.

EXAMPLE 1

A superpurification system of the type generally illustrated in FIG. 1 is used for the purification of potassium chloride, using water as the solvent. The following steps are provided for readying the system.

Fifteen kilograms of distilled water and 10 kilograms of potassium chloride feed are added to the feed dissolver. This added water provides a permanent holdup of 15 kilograms of water solvent which remains in the solution body during the entire run. This water and feed are then heated to 40° C. and mixed until the feed dissolver contains 4 kilograms of undissolved crystals and 21 kilograms of warm "new" feed solution. This solution contains 15 kilograms of water solvent and 6 kilograms of potassium chloride solute. It also has a crystallization temperature of 40° C. Distilled water (5 kilograms) is added to a vessel of the processor assembly of Stage L, as well as to that of any Stage I. This addition provides a permanent holdup of 5 kilograms of water solvent which remains in the solution body of each such stage during the entire run. Distilled water (10 kilograms) is added to the crystallizer processor of Stage P in order to provide a permanent holdup of 10 kilograms of water solvent which remains in the Stage P solution body throughout the entire run. The system is run for a sufficient number of normal cycles until potassium chloride passes through progressively purer stages and finally precipitates out of the solution to form the Stage P crystal product. At this stage, the refiner is in a normal steady state operation. Approximately 10 initial cycles achieves this initial accumulation in the Stage P crystallizer.

The procedure within the refiner is described beginning with the crystallization step. The warm new solution or new feed solution that was just transferred to the process vessels and to the crystallizer is chilled from 45° C. to −10° C., causing approximately 800 grams of potassium chloride crystals to form while stirring. Stirring ceases, allowing the crystals to settle in a substantially even depth on top of the screen of each process vessel. Mother liquor is drained to the reflux compartment or vessel of that same stage until it is completely full of 1240 grams of reflux. Mother liquor drainage continues into each same stage liquid receiver, and a vacuum is drawn to "pull" mother liquor between the crystals into the liquid receiver of at least pure Stage L and in Stage I. Enough Stage P mother liquor is drained from the product crystallizer to completely fill the Stage P liquid receiver with 6200 grams of cold mother liquor. The transfer of mother liquor in each liquid receiver to the process vessel of the next less pure Stage L or Stage I or to the feed dissolver is effected.

Next, the charge of Stage L mixed mother liquor in the feed dissolver is heated to 40° C. and mixed with the feed crystals until it dissolves 800 grams of these crystals. The charge of Stage I mixed mother liquor in the Stage L processor is heated to approximately 45° C. and mixed with the Stage L crystals therein until all of the crystals have dissolved into it. The charge of the Stage P mixed mother liquor in the Stage I processor is heated to approximately 45° C. and is mixed with the Stage I crystals therein until all of those crystals have dissolved into it. During the cycle and any time after the Stage L reflux vessel is filled with Stage L mother liquor, its contents are discharged from the refiner as byproduct solution which is 1 kilogram water and 240 grams of potassium chloride solute.

During each cycle of this Example, 800 grams of potassium chloride crystals are transferred one stage upstream and 240 grams of reflux solute are transferred one stage downstream. Also, during each cycle, approximately 560 grams of Stage P crystals final product and 240 grams of reflux solute feed for the refiner are produced in the Stage P crystallizer. In addition, 6200 grams of Stage P mother liquor is produced in this crystallizer. A complete cycle is calculated to be completed every hour to provide a daily production of superpurified potassium chloride crystal product of 13.44 kilograms per day from 19.2 kilograms of feed, with 5.76 kilograms of byproduct solute being discharged each 24 hour day.

If desired, this byproduct solution may be treated in an evaporator for removing three-quarters of the water solvent by evaporation. This permits three-quarters of the potassium chloride solute to be recovered as crystals of substantially the same purity as the feed crystals, which would allow these crystals (4.32 kilograms) to be recycled to the feed dissolver each day. The mother liquor from the evaporator would be a very impure byproduct.

The cold mother liquor is to contain 240 grams of potassium chloride solute for each 1000 grams of water solvent and is to have a specific gravity of 1.14 gms/cm$^3$. The warm new solution is to contain 400 grams of potassium chloride solute for each 1000 grams of water solvent and is to have a specific gravity of 1.2 gms/cm$^3$. Each stage's reflux receiver is to have an internal volume of 1.09 liters. When each of these vessels is filled with cold reflux mother liquor, there are 1240 grams at the given specific gravity. The weight of mixed mother liquor transferred during each cycle from out of the liquid receiver of each stage to the crystals of the next less pure stage contains 5,000 grams of water and 1,200 grams of potassium chloride, for a total weight of 6,200 grams. The volume calculated from its specific gravity is 5,438 liters. The warm new solution received in each stage's liquid receiver during each cycle weighs 7,000 grams, containing 5,000 grams of water and 2,000 grams of potassium chloride and occupies a volume of 5,833 liters as calculated from its specific gravity. Neither the liquid receivers nor the processors of Stage L and Stage I should ever be completely filled during any cycle of a run. Accordingly, each is to be larger than these volumes, six liters being suitable. The volume of the Stage P liquid receiver regulates the volume of mixed mother liquor transferred to the next less pure process vessel during each cycle. In this Example, it is desired that 5.438 liters of this mother liquor be transferred, making the required internal volume of the Stage P liquid receiver 5.438 liters. On the other hand, the volume of the feed solution receiver should be 5.833 liters in order to properly regulate the volume of new feed solution fed to the Stage L process vessel during each cycle.

The solution body that is to transfer between the feed dissolver and the Stage L processor during each cycle is used to dissolve 800 grams of potassium chloride fed into the feed dissolver and to deposit 800 grams of dissolved potassium chloride into the process vessel during each cycle in order to form the Stage L crystals. In this Example, this body of liquid may contain 15 kilograms of water solvent and a variable amount of potassium chloride solute.

Another solution body which is to transfer between the Stage L and the Stage I processors during each cycle is used to dissolve 800 grams of Stage L crystals in the Stage L processor and to deposit 800 grams of Stage I crystals in the Stage I processor during each cycle. This entire solution body may contain 5 kilograms of water solvent and a variable amount of potassium chloride solute.

Another solution body which is to transfer between the Stage I processor vessel and the Stage P crystallizer during each cycle is used to dissolve 800 grams of Stage I crystals in the Stage I process vessel and to provide 560 grams of Stage P crystals. Theoretically, this is a deposit of 800 grams of Stage P crystallizable material in the Stage P crystallizer. However, 240 grams of these crystals are consumed in the production of reflux feed out of the Stage P crystallizer, making the net production of stage 3 crystals 540 grams per cycle. Throughout the entire run, this solution body may contain a substantially constant 10 kilograms of water solvent and a variable amount of potassium chloride solute, depending upon temperature conditions at any particular moment in any cycle.

In this Example, reflux feed for the refiner is to be generated in the Stage P crystallizer. During each cycle, 1 kilogram of pure water solvent is to be introduced into the Stage P crystallizer to make up this required reflux feed. At a temperature of −10° C., this kilogram of water will dissolve 240 grams of Stage P potassium chloride crystals to produce 1240 grams of reflux to account for the transfer of 1240 grams of Stage P reflux to Stage I during each cycle. This material balance enables the Stage P solution body to contain approximately the required 10 kilograms of water solvent during the entire run.

The feed dissolver for this Example may have a capacity to hold up to 10 kilograms of feed crystals and up to 15 kilograms of warm new feed solution. The Stage P crystallizer is large enough to hold up to 8 kilograms of accumulated crystals and up to 10 liters of mother liquor.

EXAMPLE 2

A three stage superpurification system of the type generally illustrated in FIG. 2 is used for the purification of guanidine hydrochloride, using water as the solvent.

Each centrifuge assembly for Stages L and I had a perforated basket lined with 100 mesh screen, an internal diameter of 25 cm (10 inches) and an inside depth of 25 cm (10 inches). Each basket was supported by a rotatable shaft driven by a motor mounted on its top end. Each catch basin had an internal diameter of 35 cm (14 inches) and a depth of 35 cm, its interior bottom surface being located 2 cm (0.8 inches) below the bottom of the basket. The central axis of the catch basin is the same as that of the basket. The catch basin had a bottom opening at its lowest point leading to a 15 liter (3 gallon) per minute circulation pump in the position shown in FIG. 2. The heat exchanger of each stage, located as in FIG. 2, had a tube through which mother liquor was pumped in an upward direction by the circulation pump. This tube was surrounded by a tube of larger diameter through which hot water was pumped in a downward direction. The hot water was circulated to and from a large tank equipped with thermostatically controlled heating means to maintain the hot water at a constant temperature of 80° C. The crystallizer for each stage had an internal diameter of 20 cm (8 inches), an internal height of 55 cm (22 inches), and a helical coil in its interior through which cold water can be circulated. The crystallizer was equipped with a stirrer of the paddle type which agitated the slurry sufficiently to keep the crystals in suspension throughout each crystallization period. Each crystallizer was equipped with a plug type valve at its bottom which controlled the flow of slurry from its lowest point to a conduit leading to the interior of the centrifuge basket of the stage. The coil in each crystallizer was chilled with cold water.

The following procedures are conducted for readying the refiner for normal production.

30 kilograms of distilled water and 120 kilograms of guanidine hydrochloride feed crystals were placed in the feed dissolver of the refiner. Then, the mixture of these materials was heated to 50° C. with stirring to produce a body of warm (50° C.) new feed solution having a crystallization temperature of 50° C. This heated body contained approximately 72 kilograms of solute and 28 kilograms of water solvent. Also, 48 kilograms of undissolved crystals remained in the feed dissolver after the heating step had been completed. Throughout the remainder of the run, the contents of the feed dissolver was maintained at 50° C.

The Stage I liquid receiver was filled with 20 kilograms of Stage I mother liquor left over from a previous run. Also, the Stage P liquid receiver was filled with 20 kilograms of Stage P mother liquor which was left over from a previous run. Each of these bodies of left over mother liquor had a crystallization temperature of 15° C. and contained approximately 7 kilograms of water solvent and 13 kilograms of solute. The Stage P crystallizer was filled with 40 kilograms of Stage P mother liquor left over from a previously conducted run. This had a crystallization temperature of 15° C. and contained 14 kilograms of water solvent and 26 kilograms of solute.

After these additions are made to the refiner, three special or start-up cycles are conducted to progress crystal material from the feed dissolver through Stage L, I and then finally to the Stage P crystallizer. The first of these cycles involves these steps:

1. The Stage L crystallizer is filled with a charge of 25 kilograms of warm feed solution from the crystallizer. This charge contains approximately 7 kilograms of water and 18 kilograms of solute and occupies a volume of 21.4 liters.

2. The Stage L crystallizer chills this charge with stirring to 15° C. to produce a slurry containing about 5 kilograms of crystals and 20 kilograms of mother liquor.

3. Then, this slurry is allowed to flow gravitationally into the Stage L centrifuge basket where it is quickly centrifuged to retain the dewatered crystals in the centrifuge basket and allow the mother liquor to flow into the Stage L liquid receiver. (The Stage L reflux receiver need not be used at this time.) The actual temperature and the crystallization temperature of the mother liquor effluent from the centrifuge is 10° C.

4. The Stage I mother liquor is transferred from the Stage I liquid receiver to the Stage L mother liquor heating circuit where it is circulated through the Stage L crystals in the Stage L centrifuge basket while being heated to a final temperature of 60° C. As a result of this heating and being mixed with the Stage L crystals, it rapidly dissolves all of these crystals. This results in a body of Stage L new solution having an actual temperature of 60° C., a crystallization temperature of 50° C. and a composition of 7 kilograms of water solvent and 18 kilograms of solute.

The second of these cycles involves these steps:

1. A 25 kilogram charge of new feed solution is transferred from the feed dissolver to the Stage L crystallizer. At this same time, the 25 kilograms of Stage L new solution is transferred from the Stage L heated mother liquor circuit to the Stage I crystallizer.

2. The Stage L and the Stage I crystallizers chill their charges of new solution to 15° C. with stirring.

3. The Stage L slurry is transferred from the Stage L crystallizer to the Stage L centrifuge basket and the Stage I slurry is transferred from the Stage I crystallizer to the Stage I centrifuge basket.

4. The Stage L and Stage I centrifuges are operated. The Stage L crystals are retained in the Stage L centrifuge basket, and the Stage I crystals are retained in the Stage I basket. The Stage L mother liquor is collected in the Stage L liquid receiver, and the Stage I mother liquor is collected in the Stage I liquid receiver.

5. The Stage L mother liquor is transferred from the Stage L liquid receiver to the feed dissolver where it is heated to 50° C. and dissolves an additional 5 kilograms of feed crystals. Just before this, a 20 kilogram charge of Stage I mother liquor, left over from a previously conducted run, is placed in the Stage L liquid receiver. Then, this Stage L mother liquor is transferred to the Stage L mother liquor heating circuit where it is heated to 60° C. and dissolves all of the Stage L crystals in the Stage L centrifuge basket. This results in a normal sized body of new Stage L solution in said circuit. At the same time, the 20 kilograms of Stage P mother liquor is transferred from the Stage P liquid receiver to the Stage I mother liquor heating circuit. This circuit is now operated in the usual manner to dissolve the 5 kilograms of Stage I crystals out of the Stage I centrifuge basket and produce a body of 25 kilograms of heated Stage I new solution.

The third of these cycles involves repeating the five steps conducted in the second cycle plus these additional operations in each of them:

1. The body of Stage I new solution is transferred from the Stage I mother liquor heating circuit to the Stage P crystallizer.

2. The Stage P crystallizer chills its 25 kilogram charge of Stage I new solution to 15° C. and produces 5 kilograms of Stage P crystals.

3. The newly formed Stage P crystals (from step 2) may be retained in the Stage P crystallizer until it is convenient to harvest them.

4. Twenty kilograms of the Stage P mother liquor, having a temperature of 15° C., is transferred from the Stage P crystallizer to the Stage P liquid receiver.

At the conclusion of this third cycle, the refiner is ready for the first of a series of normal production cycles. Each of these is with the movement of two kilograms of reflux solute downstream for every five kilograms of crystal motion upstream. In this case, downstream means movement from a stage to the next stage of lower purity. In this case, the volume of each stage's reflux receiver is adjusted to hold 3.077 kilograms of the solution having a specific gravity of 1.12 gms/cm$^3$. Therefore, the volume of each reflux receiver is 2.75 liters. Movement of material during each normal cycle include:

| | |
|---|---|
| Net crystal production of Stage P | 3 kgs |
| Reflux solute generated in Stage P | 2 kgs |
| Water addition to Stage P to make reflux | 1077 gms |
| Crystal production in each stage | 5 kgs |
| Solute leaving as byproduct from Stage L | 2 kgs |
| Feed crystals dissolved in feed dissolver | 5 kgs |

Each production cycle incorporates these steps:

1. Loading each stage's crystallizer with new solution: Stage L crystallizer receivers 25 kilograms of new feed solution from the feed dissolver. Stage I crystallizer receives 25 kilograms of Stage L new solution from the Stage L mother liquor heating circuit. Stage P crystallizer receives 25 kilograms of Stage I new solution from the Stage I mother liquor heating circuit.

2. Crystallization step: The new solution introduced into the crystallizer of each stage is chilled to 15° C. to produce 5 kilograms of crystals and 20 kilograms of mother liquor of the respective stage.

3. Liquid-solid separation step: In Stages L and I, the slurry just produced in the crystallizer of the same stage is centrifuged with the dewatered crystals being retained in the centrifuge basket and the mother liquor effluent being collected in the reflux receiver and the liquid receiver of the same stage. The reflux receiver of both of these stages is adjusted to retain 2.75 liters of mother liquor as reflux. The balance of 16.923 KGS (15.1 liters) of the mother liquor of each stage is collected in that same stage's liquid receiver.

4. Reflux transfer and crystal washing step: This step is conducted in Stages L and I and involves the transfer of the reflux mother liquor from the reflux receiver of the next purer stage to the crystals in its centrifuge basket. These centrifuge baskets may be spinning at the time of crystal washing. The effluent from this washing operation is collected in the liquid receiver of the same stage as the centrifuge in which the washing is conducted. In both of these stages, the reflux wash effluent, originating from the next purer stage, mixes with the mother liquor already collected in the liquid receiver of that stage. This mixture is called mixed mother liquor. Thus, at the end of this step, there are 20 kilograms of Stage L mixed mother liquor in the Stage L liquid receiver and the same weight of Stage I mixed mother liquor in the Stage I liquid receiver.

5. Crystal dissolving step: The mixed mother liquor of each stage is transferred to a heated mother liquor circulation system of the next lower purity stage. This circuit of each of these stages provides means to cause the heated mother liquor to mix with and dissolve the crystals in the centrifuge basket of said stage. This results in a body of 25 kilograms of new Stage L solution in the Stage L mother liquor heated circuit and a like amount of Stage I new solution in the Stage I heated mother liquor circuit.

At this time, the refiner is ready for the start of the next cycle. As additional cycles are conducted, a sufficient supply of feed crystals are introduced into the feed dissolver to prevent it from running out of crystal material. Superpurified crystal product is harvested from the Stage P crystallizer often enough to prevent that crystallizer from becoming overloaded with crystals.

It will be understood that the embodiments of the present invention which have been described are illustrative of some of the applications of the principles of the present invention. Numerous modifications may be made by those skilled in the art without departing from the true spirit and scope of the invention.

I claim:

1. A method for superpurifying crystallizable substances by a multistage recrystallization procedure, comprising:

providing a plurality of stages having vessels with crystallizable substances therein and operating said stages by proceeding with a sequence of steps in a cyclic manner through a plurality of substantially duplicate cycles conducted substantially simultaneously within each stage such that the crystallizable substance is dissolved in each stage beginning with a least pure stage, transferred as a fully dissolved component of a new solution to the next purer stage, and recrystallized in the next purer stage until superpurified through recrystallization in the purest stage, the sequence of steps including:

(a) transferring a quantity of mother liquor containing crystals of the crystallizable substance and a solvent for the crystallizable substance from a liquid receiver of each stage into a processor having crystallizing capabilities of each next less pure stage;

(b) dissolving the crystals of step (a) within the mother liquor of step (a) to form a new solution in each processor of the next less pure stage;

(c) transferring each new solution formed in step (b), while avoiding transfer of crystallized material apart from said new solution, to the processor of the next purer stage;

(d) crystallizing crystallizable material within each new solution of each processor to form crystals, said crystals of the most pure stage being a recrystallized superpurified substance;

(e) separating the crystals formed in step (d) from its mother liquor in at least the processors of stages other than the most pure stage to provide separated crystals, and collecting the thus separated mother liquor for subsequent use in step (a) of a next cycle; and (f) discharging mother liquor as a byproduct from the least pure stage.

2. The method of claim 1, further including the step of washing the separated crystals of step (e) with mother liquor from the next purer stage.

3. The method of claim 2, wherein the mother liquor transferred in step (a) is a mixed mother liquor formed by combining mother liquor from that same stage with mother liquor passed into that stage during said washing step.

4. The method of claim 1, wherein said step (e) separating includes further separating mother liquor from the separated crystals of step (e) to thereby withdraw mother liquor from between the crystals and provide dewatered crystals.

5. The method of claim 4, further including the step of washing the dewatered crystals with mother liquor from the next purer stage.

6. The method of claim 5, wherein the mother liquor transferred in step (a) is a mixed mother liquor formed by combining mother liquor from that same stage with mother liquor passed into that stage during said washing step.

7. The method of claim 4, wherein step (a) is carried out within a centrifuge processor having a basket containing the crystals whereby the new solution formed by dissolving step (b) is contained within the centrifuge;

the step (c) transferring of each new solution is to a processor crystallizer of the next purer stage;

said step (d) crystallizing step is carried out within each said crystallizer; and said separating and further separating steps are carried out by the centrifuge of at least the stages other than the most pure stage.

8. The method of claim 1, wherein step (a) is carried out within a centrifuge processor having a basket containing the crystals whereby the new solution formed by dissolving step (b) is contained within the centrifuge; the step (c) transferring of each new solution is to a processor crystallizer of the next purer stage; and said step (d) crystallizing step is carried out within each said crystallizer.

9. The method of claim 8, wherein said step (d) crystallizing is carried out in a plurality of crystallization steps each crystallizing less than all of the crystallizable material within each new solution.

10. The method of claim 8, wherein said dissolving step (b) includes recycling the crystals and mother liquor between the centrifuge and a heat exchanger which raises the temperature of the crystals and mother liquor.

11. The method of claim 1, wherein the plurality of stages are closed to undesired environmental influences external of the stages.

12. The method of claim 1, wherein the quantity of mother liquor transferred is substantially the same in each of step (a) and is substantially the same as the mother liquor discharged in step (f).

13. The method of claim 1, wherein equal quantities of crystallizable material are transferred during each stage.

14. The method of claim 1, wherein the solvent of step (a) for the purest stage is substantially pure solvent added into the purest stage and which is not transferred from any of the plurality of stages.

15. A method for superpurifying crystallizable substances by a multistage recrystallization procedure, comprising:

providing a plurality of stages having vessels with crystallizable substances therein and operating said stages by proceeding with a sequence of steps in a cyclic manner through a plurality of cycles conducted within each stage such that the crystallizable substance is dissolved in each stage beginning with a least pure stage, transferred as a fully dissolved component of a new solution to the next purer stage, and recrystallized in the next purer stage until superpurified through recrystallization in the purest stage, the sequence of steps including:

(a) transferring a quantity of mother liquor containing crystals of the crystallizable substance and a solvent for the crystallizable substance from a liquid receiver of a stage of a multistage recrystallization system into a vessel, the quantity of mother liquor being from the next less pure stage;

(b) dissolving the crystals of step (a) within the mother liquor of step (a) to form a new solution;

(c) transferring each new solution formed in step (b) to the processor while avoiding transfer of crystallizable material apart from each said new solution;

(d) crystallizing crystallizable material within each new solution in the processor to form crystals, said crystals from the most pure stage being a recrystallized superpurified substance;

(e) separating the crystals formed in step (d) from its mother liquor in at least the stages other than the most pure stage to provide separated crystals and collecting the thus separated mother liquor for subsequent use in step (a) of a next cycle; and (f) discharging mother liquor as a byproduct from the least pure stage.

16. The method of claim 15, further including the step of washing the separated crystals of step (e) with mother liquor from the next purer stage.

17. The method of claim 15, wherein said step (e) separating includes further separating mother liquor from separated crystals of step (e) to thereby withdraw mother liquor from between the crystals and provide dewatered crystals.

18. The method of claim 17, further including the step of washing the dewatered crystals with mother liquor from the next purer stage.

19. The method of claim 18, wherein step (a) is carried out within a processor including a centrifuge having a basket containing the crystals whereby the new solution formed by dissolving step (b) is contained within the centrifuge;

the step (c) transferring of each new solution is to a crystallizer of the processor;

said step (d) crystallizing step is carried out within the crystallizer; and said separating and further separating steps are carried out by the centrifuge.

20. The method of claim 15, wherein the mother liquor transferred in step (a) is a mixed mother liquor formed by combining mother liquor from that same stage with mother liquor passed into that stage during said washing step.

21. The method of claim 18, wherein the mother liquor transferred in step (a) is a mixed mother liquor formed by combining mother liquor from that same stage with mother liquor passed into that stage during said washing step.

22. The method of claim 15, wherein step (a) is carried out within a centrifuge processor having a basket containing the crystals whereby the new solution formed by dissolving step (b) is contained within the centrifuge; the step (c) transferring of each new said step (d) crystallizing step is carried out within said crystallizer.

23. The method of claim 22, wherein said dissolving step (b) includes recycling the crystals and mother liquor between the centrifuge and a heat exchanger which raises the temperature of the crystals and mother liquor.

24. The method of claim 15, wherein the solvent of step (a) for the purest stage is substantially pure solvent added into the purest stage and which is not transferred from and of the plurality of stages.

* * * * *

UNITED STATES PATENT AND TRADEMARK OFFICE
CERTIFICATE OF CORRECTION

PATENT NO. : 5,466,266
DATED     : November 14, 1995
INVENTOR(S) : Kenneth F. Griffiths It is certified that error appears in the above-indentified patent and that said Letters Patent is hereby corrected as shown below:

On the title page, item [56]  "References Cited", "U.S. Patent Documents", Pat. No. 4,406,679, the date should read --9/1983--.
Col. 6, line 13, "6" should read --26--; line 31, "41b," should read --41b--.
Col. 9, line 33, "151a," should read --151a--.
Col. 11, line 64, "35c" should read --135c--.
Col. 14, line 51, insert a period after "controlled".
Col. 15, line 28, "136ais" should read --136a is--.
Col. 16, line 22, "according the" should read --according to the--; line 27, "Cesium" should read --cesium--.
Col. 17, line 67, "5,438" should read --5.438--.
Col. 18, line 3, "5,833" should read --5.833--.
Col. 19, line 44, "was" should read --were--.
Col. 21, line 28, "receivers" should read --receives--.
Col. 24, line 53, after "new" and before "said", insert --solution is to a crystallizer of the processor; and--; line 61, "from and" should read --from any--.

Signed and Sealed this

First Day of October, 1996

Attest:

BRUCE LEHMAN

Attesting Officer

Commissioner of Patents and Trademarks